United States Patent
Lee et al.

(10) Patent No.: US 7,102,716 B2
(45) Date of Patent: Sep. 5, 2006

(54) LCD WITH TFT ON UPPER SUBSTRATE AND COLOR FILTER ON EACH SUBSTRATE

(75) Inventors: Jeong Ha Lee, Kyoungki-do (KR); Bong Yeol Ryu, Kyoungki-do (KR); Hye Kyung Chae, Kyoungsangnam-do (KR)

(73) Assignee: Boe Hydis Technology Co., Ltd., Kyoungki-do (KR)

( * ) Notice: Subject to any disclaimer, the term of this patent is extended or adjusted under 35 U.S.C. 154(b) by 107 days.

(21) Appl. No.: 10/889,881

(22) Filed: Jul. 13, 2004

(65) Prior Publication Data
US 2005/0168671 A1 Aug. 4, 2005

(30) Foreign Application Priority Data
Feb. 4, 2004 (KR) ............... 10-2004-0007286

(51) Int. Cl.
*G02F 1/1335* (2006.01)
(52) U.S. Cl. ................... 349/114; 349/106
(58) Field of Classification Search ........... 349/106, 349/113–114
See application file for complete search history.

(56) References Cited
U.S. PATENT DOCUMENTS
6,621,543 B1 * 9/2003 Moon ................. 349/115
6,954,241 B1 * 10/2005 Takizawa et al. ........ 349/106
2002/0047962 A1 * 4/2002 Tanaka et al. ........... 349/110

FOREIGN PATENT DOCUMENTS
JP 2002268042 9/2002
KR 20030051290 6/2003

* cited by examiner

*Primary Examiner*—Andrew Schechter
*Assistant Examiner*—Phu Vu
(74) *Attorney, Agent, or Firm*—Ladas & Parry LLP

(57) ABSTRACT

Disclosed are a transflective liquid crystal display device and a method for manufacturing the same, capable of simply forming a reflection section and driving a liquid crystal display device with a transmission mode or a transflective mode by using the same array substrate. After preparing the upper substrate, the thin film transistor is formed in the switching region of the upper substrate. Color resin is coated on the thin film transistor, and is developed to form the color filter. The light-shielding layer is formed on the color filter to prevent current from being leaked from the thin film transistor. The lower substrate is formed in such a manner that the lower substrate is spaced by a predetermined distance from the upper substrate. The reflection plate is formed on the reflection section. The transparent electrode is formed on the reflection plate.

4 Claims, 4 Drawing Sheets

LCD WITH TFT ON UPPER SUBSTRATE AND COLOR FILTER ON EACH SUBSTRATE

BACKGROUND OF THE INVENTION

1. Field of the Invention

The present invention relates to a liquid crystal display device, and more particularly to a liquid crystal display device integrated with a color filter and capable of simultaneously performing a transmission mode and a reflection mode.

2. Description of the Prior Art

A transflective TFT-LCD can display an image in an indoor place while turning on a backlight, and can display the image in an outdoor place without incurring power consumption caused by the backlight and an image distortion caused by a surface reflection caused by a polarizing plate. Also, the transflective TFT-LCD can ensure a coupling margin for upper and lower plates and decrease the cost required for manufacturing a separated color filter by integrally forming a color filter.

As technology for transflective liquid crystal display devices has been developed, color filters have been integrally formed with transflective liquid crystal display devices through a simple masking process. Also, driving substrates each of the transflective liquid crystal display devices are manufactured such that driving substrates can be used for transmission liquid crystal display devices as well as for transflective liquid crystal display devices, thereby improving productivity. According to conventional technology for transflective liquid crystal display devices, a resin process for fabricating a reflection section is necessary, so that the manufacturing process is complicated. Differently from a transmission TFT-LCD, the transflective liquid crystal display device requires separate fabrication of a transmission array substrate and a color filter substrate, so equipment in a manufacturing line is easily damaged while increasing manufacturing costs.

In addition, when the resin process is performed in order to form a reflection plate on a conventional array substrate, a high fault rate of articles and a low yield rate thereof may occur because it is required to form a convex-concave section and a hole pattern of a TFT, and an embossing pattern. Also, when a color filter is integrated on the array substrate on which such a reflection plate is formed, productivity is decreased due to an addition of the resin process and a high step difference caused by the reflection plate. In addition, it is impossible to realize the same color tone even if the same RGB color resin of the color filter is used due to a higher resin step difference formed between a transmission section and a reflection section by the reflection plate.

FIGS. 1 and 2 are sectional views of a conventional transflective TFT-LCD.

As shown in FIGS. 1 and 2, a TFT unit, a resin unit, a resin pattern, and a reflection plate are formed in order to form an array substrate. When the array substrate of the conventional transflective TFT-LCD is manufactured, the manufacturing process may be complicated due to a high surface step difference and hole formation, so that a high fault rate may result. In addition, a color filter 104 is formed on an upper substrate 102, and a TFT 108 is formed on a lower substrate 106, respectively, so that a width of a black matrix for ensuring a coupling margin is relatively enlarged, thereby increasing an aperture ratio.

In color filter integration technology applied to a transflective LCD or a reflection LCD, a color resin unit, though which light is transmitted, is shielded by the reflection plate made of a metal, so that the color resin unit cannot be formed on the array substrate together with the reflection plate. Also, when color resin is formed on the array substrate so as to utilize the color resin for the reflection section, the color resin may become a dual parameter for adjusting thickness of the reflection section and the color filter, so it is impossible to achieve a proper color characteristic or a cell gap of the reflection section.

SUMMARY OF THE INVENTION

Accordingly, the present invention has been made to solve the above-mentioned problems occurring in the prior art, and an object of the present invention is to provide a transflective liquid crystal display device and a method for manufacturing the same, in which a color filter is integrated with an array substrate in order to simplify processes for forming a reflection section, and a liquid crystal display device can be driven with a transmission mode or a transflective mode by using the same array substrate.

In order to accomplish this object, there is provided a transflective liquid crystal display device comprising: an upper substrate; a thin film transistor formed in a switching region of the upper substrate; a color filter formed by coating resin on the thin film transistor, and developing the resin; a light-shielding layer formed on the color filter in order to prevent current from being leaked from the thin film transistor; a lower substrate having a reflection section and a transmission section and formed through resin coating, resin patterning, and embossing patterning processes in such a manner that the lower substrate is spaced by a predetermined distance from the upper substrate; a reflection plate formed on the reflection section; and a transparent electrode formed on the reflection plate.

According to another aspect of the present invention, there is provided a method for manufacturing a transflective liquid crystal display device, the method comprising the steps of: preparing an upper substrate; forming a thin film transistor in a switching region of the upper substrate; forming a color filter by coating resin on the thin film transistor, and developing the resin; forming a light-shielding layer on the color filter in order to prevent current from being leaked from the thin film transistor; forming a lower substrate having a reflection section and a transmission section through resin coating, resin patterning, and embossing patterning processes in such a manner that the lower substrate is spaced by a predetermined distance from the upper substrate; forming a reflection plate on the reflection section; and forming a transparent electrode on the reflection plate.

BRIEF DESCRIPTION OF THE DRAWINGS

The above object, features and advantages of the present invention will be more apparent from the following detailed description taken in conjunction with the accompanying drawings, in which.

DETAILED DESCRIPTION OF THE PREFERRED EMBODIMENTS

Figure 1:
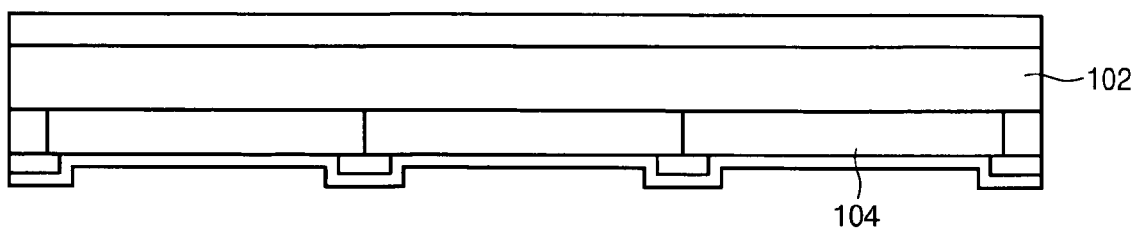
FIGS. 1 and 2 are sectional views of a conventional transflective TFT-LCD.
Figure 1:
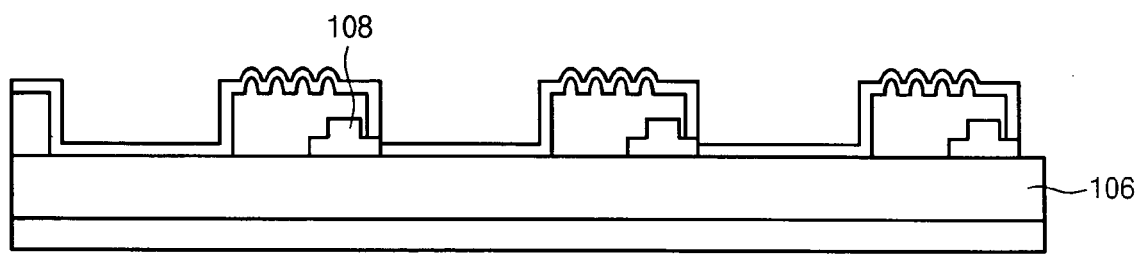
Figure 2:
Figure 2:
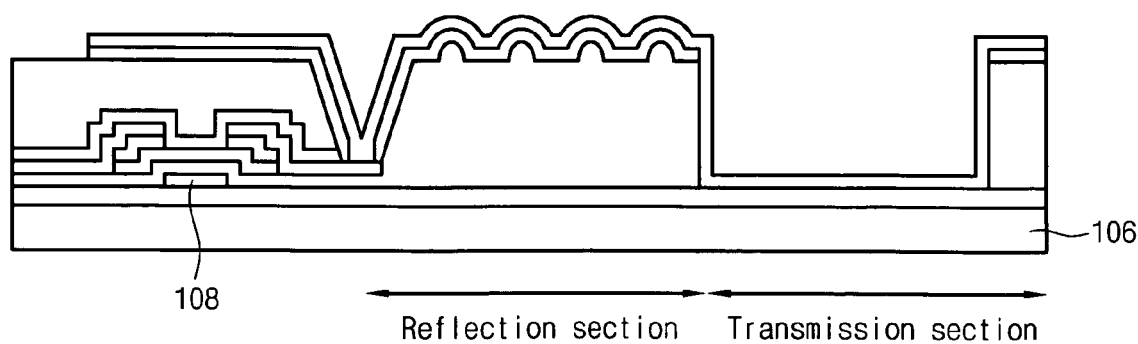

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 3:
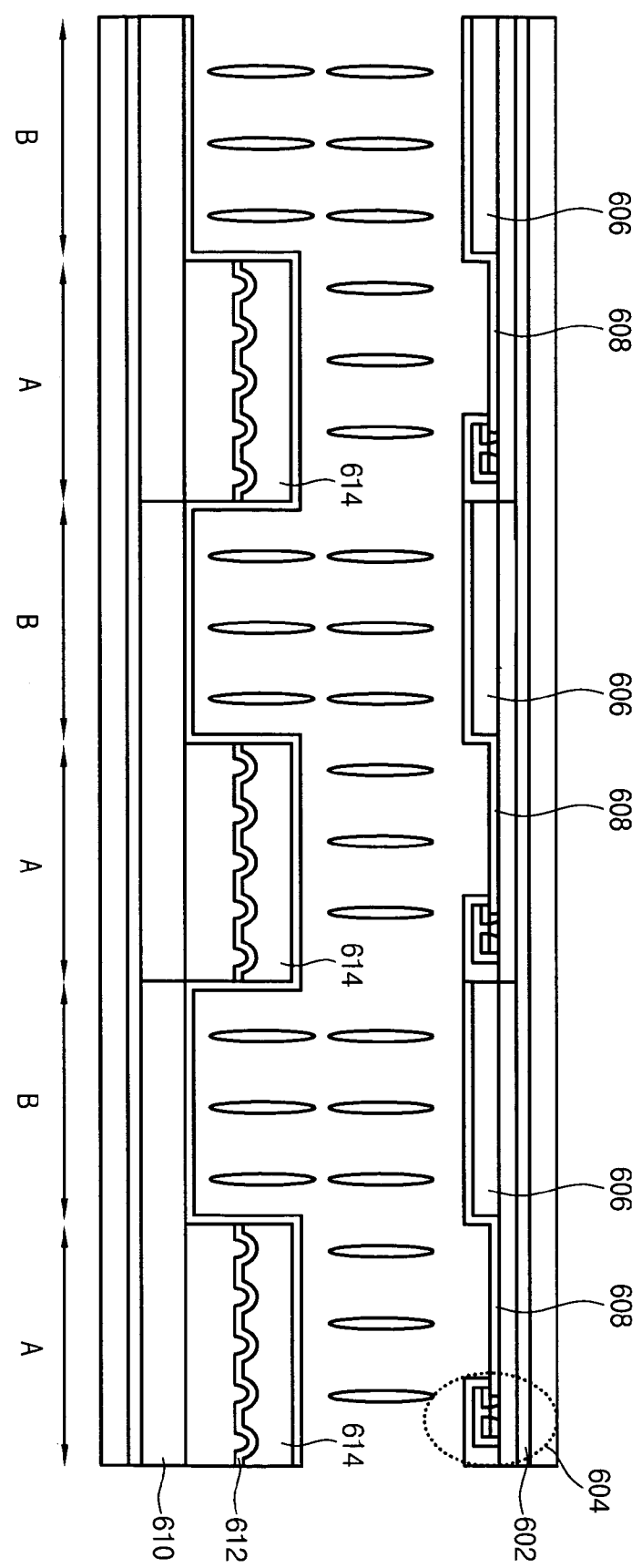
FIG. 3 is a sectional view showing a transflective liquid crystal display device according to one embodiment of the present invention.
Figure 4:
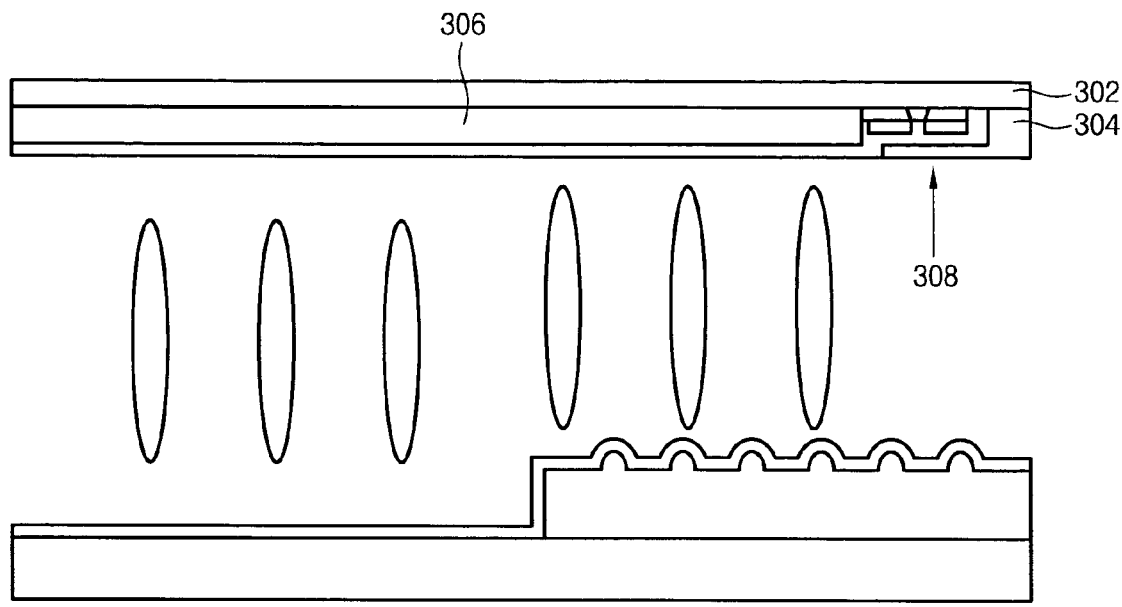
FIG. 4 is a sectional view showing a transflective liquid crystal cell according to one embodiment of the present invention.

FIG. 3 is a sectional view showing a transflective liquid crystal display device according to one embodiment of the present invention, and FIG. 4 is a sectional view showing a transflective liquid crystal cell according to one embodiment of the present invention.

The transflective liquid crystal display device according to one embodiment of the present invention includes an upper substrate 302, a thin film transistor 304, an R,G,B color filter 306, a light-shielding layer 308, a lower substrate 310 having a reflection section A and a transmission section B, a reflection plate 312, and a transparent electrode 314.

Hereinafter, a method for manufacturing a transflective liquid crystal display device according to one embodiment of the present invention will be explained with reference to FIGS. 3 and 4.

Firstly, the upper substrate 302 forming an array substrate having a switching region is prepared. Then, the thin film transistor 304 is formed in the switching region of the upper substrate 302. A gate electrode, a gate insulation layer, an active layer, source and drain electrodes, and a protective layer are sequentially formed on the thin film transistor 304. R,G,B resin is coated on the thin film transistor 304, and then, is developed in order to form the color filter 306. The color filter 306 is formed by the resin. The light-shielding layer 308, such as a black matrix, is formed on the color filter 306 in order to prevent current from being leaked from the thin film transistor 304.

The lower substrate 310 having the reflection section A and the transmission section B is formed through resin coating, resin patterning, and embossing patterning processes in such a manner that the lower substrate 310 is spaced by a predetermined distance from the upper substrate. The reflection section A is a resin layer for forming a reflective region, and the transmission section B is a resin layer for forming a transmission region.

The reflection plate 312 having a convex-concave shape is formed on the reflection section A of the lower substrate 310. The transflective liquid crystal display device according to the present invention is driven with a reflection mode by using the reflection plate 312 when a backlight is turned off. The transparent electrode 314 is formed on the reflection plate 312.

Differently from the conventional transflective substrate, the lower substrate 310 having the reflection section A and the transmission section B has no thin film transistor. A resin pattern, a reflection plate pattern, and a common electrode are formed on the lower substrate 310 by using two to four masks. That is, the resin pattern, the reflection plate pattern, and the common electrode can be formed by using a smaller number of masks as compared with a transflective pattern and the common electrode pattern formed on a thin film transistor array substrate by using seven to nine masks, so a high yield rate may be achieved. In addition, according to the array substrate of the present invention, not only the transflective lower substrate, but also a glass layer formed with a dummy common electrode (transparent electrode) are combined with the array substrate, so the array substrate can be commonly used for the transflective liquid crystal display device having the reflection section and the transmission section and the transmission liquid crystal display device, thereby increasing productivity and improving management efficiency for an assembling line.

Figure 5:
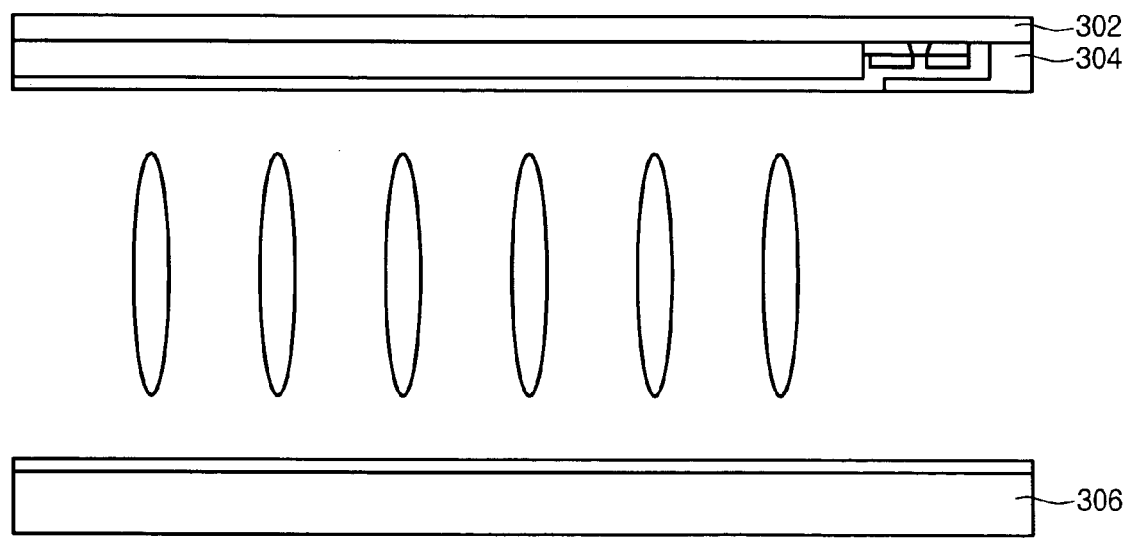
FIG. 5 is a sectional view showing a transmission liquid crystal cell using a transflective substrate according to one embodiment of the present invention.

FIG. 5 is a sectional view showing a transmission liquid crystal cell using a transflective substrate according to one embodiment of the present invention. The lower substrate 310 formed with the transmissive electrode can be flexibly used for the transmission liquid crystal display device without exchanging the array substrate of the transmission liquid crystal display device.

Figure 6:
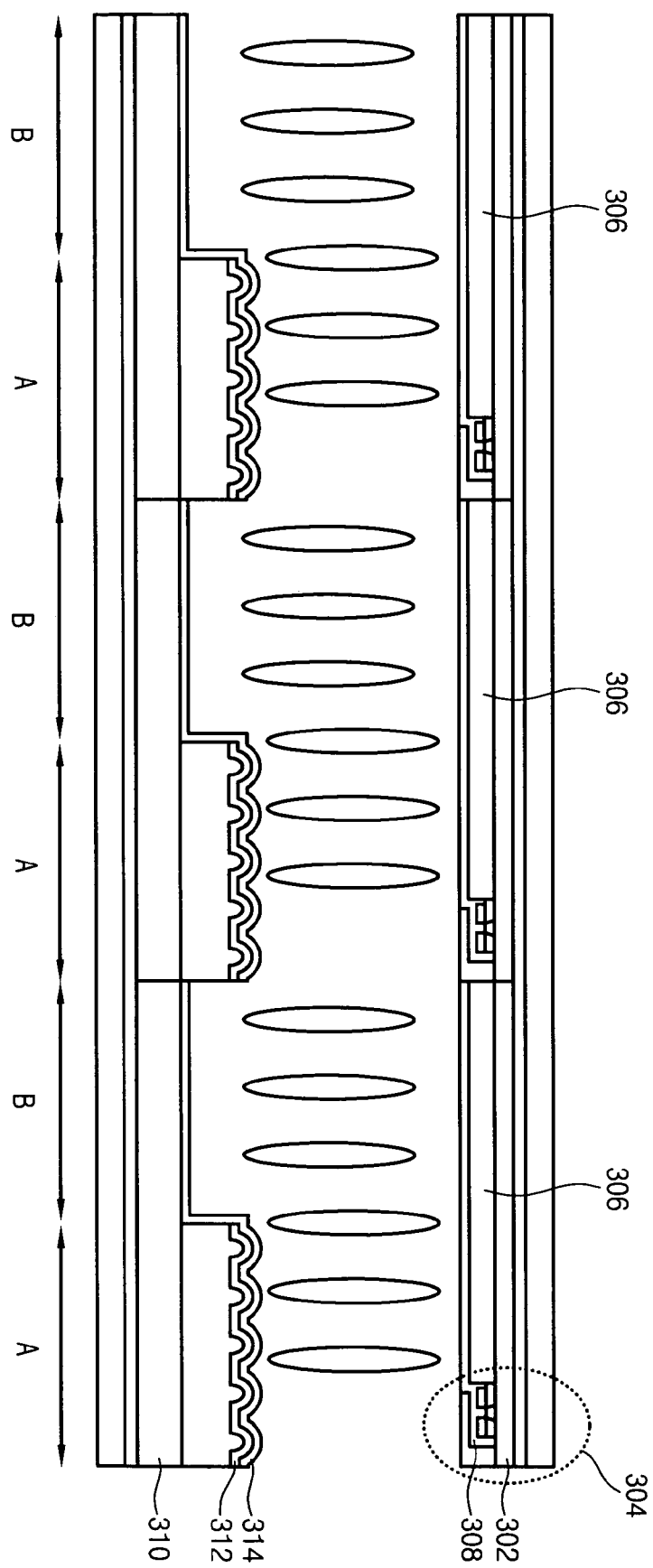
FIG. 6 is a sectional view showing a transflective liquid crystal display device according to another embodiment of the present invention.

FIG. 6 is a sectional view showing a transflective liquid crystal display device according to another embodiment of the present invention.

The transflective liquid crystal display device according to another embodiment of the present invention includes an upper substrate 602, a thin film transistor 604, an R,G,B color filter 606, a light-shielding layer 608, a lower substrate 610 having a reflection section A and a transmission section B, a reflection plate 612, and an R',G',B' color filter 614.

Hereinafter, a method for manufacturing a transflective liquid crystal display device according to another embodiment of the present invention will be explained with reference to FIG. 6.

Firstly, the upper substrate 602 forming an array substrate having a switching region is prepared. Then, the thin film transistor 604 is formed in the switching region of the upper substrate 602. A gate electrode, a gate insulation layer, an active layer, source and drain electrodes, and a protective layer are sequentially formed on the thin film transistor 604. R,G,B resin is coated on the thin film transistor 604, and then, is developed in order to form the color filter 606. At this time, in order to improve reflectivity in a reflection mode, color resin is only formed on the transmission section of the upper substrate. That is, the color resin is not formed on the reflection section of the upper substrate. The light-shielding layer 608, such as a black matrix, is formed on the color filter 606 in order to prevent current from being leaked from the thin film transistor 604.

The lower substrate 610 having the reflection section A and the transmission section B is formed through resin coating, resin patterning, and embossing patterning processes in such a manner that the lower substrate 610 is spaced by a predetermined distance from the upper substrate. The reflection section A and the transmission section B are formed by the resin. The reflection plate 312 having a convex-concave shape is formed on the reflection section A of the lower substrate 610. The R',G',B' color filter 614 is formed on the reflection plate 612 by the color resin. According to the present invention, the color filter 606 has a color tone different from a color tone of the R',G',B' color filter 614.

The R',G',B' color filter 614, Which is a color resin layer formed on the reflection section A of the lower substrate 610, has two-tone color resin with respect to a resin layer for the R,G,B color filter 606 of the upper substrate 602. Also, the R',G',B' color filter 614 is formed with a thin thickness or with a high white ratio in order to increase a reflection rate thereof. Due to the R,G,B color filter 606 of the upper substrate and the R',G',B' color filter 614 of the lower substrate, six-color filtering effect may be obtained. If a six-color filter is provided in a single substrate, a process fault may occur because a color filter mask is added to the process. According to the present invention, three-color masks are provided for the upper and lower substrates, respectively, so that process fault may be reduced. Also, an embossing step difference is planarized by forming an R',G',B' color resin layer on an embossing layer of the reflection plate, so a uniform cell gap may be ensured.

According to the present invention, a yield rate and productivity of articles may increase by simplifying the process for fabricating the liquid crystal display device having the reflection plate. Also, single array substrate can be flexibly applied to both transflective and transmission liquid crystal display devices. Accordingly, when fabricating or designing the array substrate of the liquid crystal display device according to the present invention, an increase of the manufacturing cost caused by the color filter may be disregarded, so that the manufacturing cost for the liquid crystal display device can be reduced.

In addition, according to the present invention, non-uniformity of a cell gap caused by the embossing step difference of the reflection section may be prevented. Furthermore, fault of products or inferior image quality caused by the cell gap may be reduced. In addition, by separately performing a process for forming the two-tone color filter resin layer, a masking process can be simplified when forming the two-tone color filter resin.

The preferred embodiment of the present invention has been described for illustrative purposes, and those skilled in the art will appreciate that various modifications, additions and substitutions are possible, without departing from the scope and spirit of the invention as disclosed in the accompanying claims.

What is claimed is:

1. A transflective liquid crystal display device comprising:
   an upper substrate;
   a thin film transistor formed in a switching region of the upper substrate;
   a color filter formed by coating resin on the thin film transistor, and developing the resin;
   a light-shielding layer formed on the color filter in order to prevent current from being leaked from the thin film transistor;
   a lower substrate having a reflection section and a transmission section and formed through resin coating, resin patterning, and embossing patterning processes in such a manner that the lower substrate is spaced by a predetermined distance from the upper substrate;
   a reflection plate formed on the reflection section said reflection plate having an additional color filter formed by a color resin; and
   a transparent electrode formed on the reflection plate.

2. The transflective liquid crystal display device as claimed in claim 1, wherein the color filter has a color tone different from a color tone of the additional color filter.

3. A method for manufacturing a transflective liquid crystal display device, the method comprising the steps of:
   preparing an upper substrate;
   forming a thin film transistor in a switching region of the upper substrate;
   forming a first color filter by coating resin on the thin film transistor, and developing the resin;
   forming a light-shielding layer on the color filter in order to prevent current from being leaked from the thin film transistor;
   forming a lower substrate having a reflection section and a transmission section through resin coating, resin patterning, and embossing patterning processes in such a manner that the lower substrate is spaced by a predetermined distance from the upper substrate;
   forming a reflection plate on the reflection section;
   forming a second color filter on said reflection plate by a color resin thereon; and
   vii) forming a transparent electrode on the reflection plate.

4. The method as claimed in claim 3, wherein the color resin is only formed in the transmission section without being formed in the reflection section in order to improve reflectivity in a reflection mode.

* * * * *